United States Patent
Jakuba et al.

[11] Patent Number: 6,142,090
[45] Date of Patent: Nov. 7, 2000

[54] POWER CONVERTER ARRANGEMENT FOR INTEGRATION INTO A SHIP STRUCTURE

[75] Inventors: Jeffrey B. Jakuba, Ledyard, Conn.; Edgar S. Thaxton, Bradford, R.I.

[73] Assignee: Electric Boat Corporation, Groton, Conn.

[21] Appl. No.: 09/167,801

[22] Filed: Oct. 7, 1998

[51] Int. Cl.[7] .................................................. B63B 17/00
[52] U.S. Cl. ............................................................. 114/65 R
[58] Field of Search ................................ 114/65 R; 440/6

[56] References Cited

U.S. PATENT DOCUMENTS

| | | |
|---|---|---|
| 4,398,484 | 8/1983 | Pierart . |
| 4,678,439 | 7/1987 | Schlichthorst . |
| 4,747,360 | 5/1988 | Tuncel et al. . |
| 5,022,628 | 6/1991 | Johnson et al. . |
| 5,199,912 | 4/1993 | Dade et al. . |
| 5,259,332 | 11/1993 | Sekiguchi et al. . |
| 5,417,597 | 5/1995 | Levedahl . |

FOREIGN PATENT DOCUMENTS 2 085 396   4/1982   United Kingdom .

*Primary Examiner*—Sherman Basinger
*Attorney, Agent, or Firm*—BakerBotts, LLP

[57] ABSTRACT

In the embodiments described in the specification, a power converter unit contains a series of enclosures mounted on a platform which is supported from a ship's hull structure by isolation mounts. Each enclosure includes power conversion modules and is supplied with power cables, cooling liquid pipes and control lines from a panel forming a back wall of the enclosure. The power converter modules are supported in the enclosure for displacement out of the enclosure for inspection and testing and flexible power cables, cooling liquid pipes and control lines are provided to facilitate testing and inspection.

9 Claims, 2 Drawing Sheets

POWER CONVERTER ARRANGEMENT FOR INTEGRATION INTO A SHIP STRUCTURE

BACKGROUND OF INVENTION

This invention relates to power converter arrangements for marine vessels.

As marine propulsion and power distribution systems advance from conventional mechanical drive and generator systems to electric drive and power converter systems, the electrical generating requirements of the ship increase greatly. Increases in the size and weight of the equipment normally associated with additional electrical generating capacity, however, are not acceptable in certain shipboard installations. Advances in the field of power electronics have enabled ship builders to utilize power generation and conversion equipment having greater power density permitting a reduction in the size and weight of components while improving their overall performance efficiency, flexibility and reliability. Furthermore, power supply arrangements which are based on modular and scalable power converters are desirable. Conventional power converters can be electrically connected in multiple parallel and series configurations to meet individual system power, voltage and current demands.

Heretofore, various power and other components have been supplied in modular form for mounting in a ship. For example, U.S. Pat. No. 4,398,484 discloses an arrangement for installing a nuclear reactor block in a vessel and a hoisting arrangement for accomplishing such installation and U.S. Pat. No. 4,678,439 pertains to the installation of a modular engine and transmission for propulsion purposes in a ship. Similarly, U.S. Pat. No. 4,747,360 discloses the installation of a support system for a marine turbine power plant with an integral condenser and U.S. Pat. No. 5,022,628 discloses the installation into a ship of a flexible raft on which machinery is mounted and a method of supporting the raft using controlled electromagnets to reduce transmission of vibration to the ship's hull. In U.S. Pat. No. 5,199,912 an electric power system for large marine vehicles and an arrangement for distributing AC and DC power to various loads are described. U.S. Pat. No. 5,259,332 describes an arrangement in which engine room equipment is distributed according to function and each group of equipment components is mounted in a frame or module and the modules are then arranged in a predetermined pattern within the engine room. Pre-tested, pre-aligned propulsion and ship service power modules are removably installed into a high speed ship such as a destroyer according to U.S. Pat. No. 5,417,597. Each of these power modules consists of a gas turbine, a ship service alternator, and a propulsion alternator. However, none of the prior art discloses or suggests integration of power conversion modules into a ship structure.

SUMMARY OF THE INVENTION

Accordingly, it is an object of the present invention to provide a method and arrangement for integrating a power converter unit into a ship's structure which overcomes disadvantages of the prior art.

Another object of the invention is to provide a method and arrangement for integration of a power converter unit into a ship's structure which allows the use of scalable power conversion modules that can be easily racked out for servicing and replacement and which provides protection from shock, vibration and environmental exposure.

These and other objects of the invention are attained by providing an assembled power converter unit which is supported by isolation mounts from a ship's hull and contains a plurality of enclosures on the platform to receive modules containing power converters so that the components incorporated into the modules do not need to satisfy shock and vibration standards which would be required for components that are not isolated. Each platform includes power cables and cooling piping arrays arranged to permit the corresponding module to be racked out of the enclosure for inspection or servicing without requiring disconnection, but are capable of being disconnected conveniently for a quick replacement of the module. In a preferred embodiment, the enclosure also provides protection from electromagnetic interference and has bus work arranged to minimize the effects of stray inductance and skin effects.

BRIEF DESCRIPTION OF THE DRAWINGS

Further objects and advantages of the invention will be apparent from reading of the following description in conjunction with the accompanying drawings in which.

DESCRIPTION OF PREFERRED EMBODIMENTS

Figure 1:
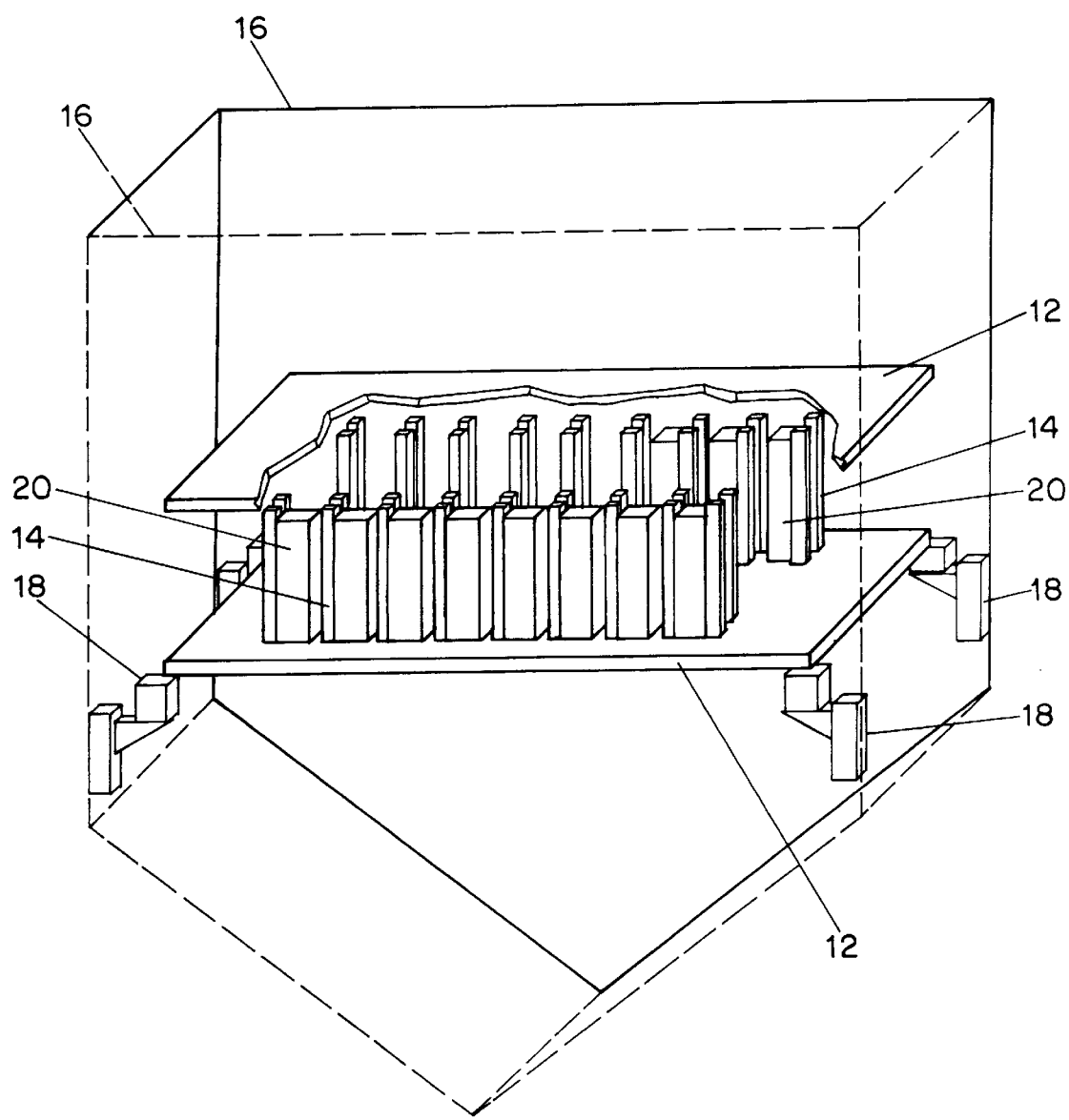
FIG. 1 is a schematic perspective view illustrating a representative arrangement for integrating a power converter unit into a ship's structure according to the invention.
Figure 2:
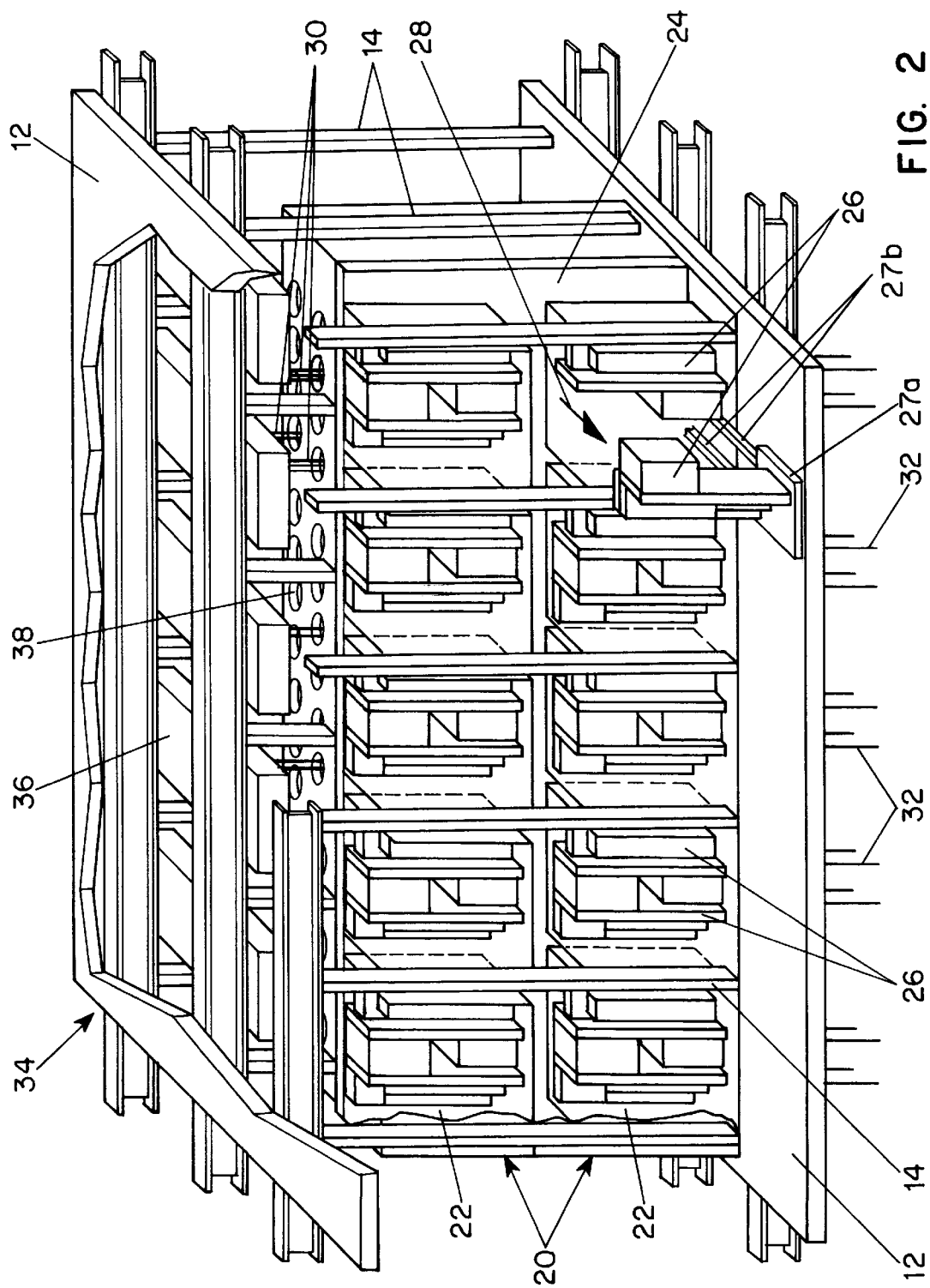
FIG. 2 is an enlarged perspective view of the power converter unit shown in FIG. 1.

In the typical embodiment of the invention shown in FIGS. 1 and 2, two vertically spaced horizontal platforms 12, connected by an array of vertical stanchions 14, are supported from the ship's hull structure 16 by a plurality of isolation mounts 18 which are designed to provide the necessary protection from shock and vibration. Two rows of welded enclosures 20 are located between adjacent pairs of stanchions. Each enclosure is formed by welded partitions 22 and has a back service panel 24 to which electrical cables and cooling liquid pipes are connected to supply power and cooling to the enclosure.

Within each enclosure 20 one or more power conversion modules 26 are removably installed. The modules 26 are supported by a moveable support 27a on rack mounts 27b which permit them to be withdrawn from the enclosure for inspection and servicing as shown by the arrow 28 in FIG. 2. Flexible cables and piping in each enclosure connect the modules to cables 30 and piping 32 in the back panel 24 to facilitate withdrawal of each module for inspection and servicing and for convenient connection and disconnection of the modules to the cables and piping. In addition, each enclosure includes necessary drawer slide assemblies, doors, ventilation and cooling components, piping valves, cabling, bus work and electrical connectors necessary for operation of the modules.

The entire assembly of platforms 12, stanchions 14, enclosures 20 and service panels 24, with cables 30 and piping 32 is prefabricated to provide an integrated unit 34 for unitary installation on the isolation mounts 18. All of the modular equipment is installed and tested within the unit 34 prior to mounting the integrated unit 34 in the ship. Once the integrated unit is placed in the ship, the ship's piping and cabling is connected to the unit cable 30 and piping 32 in predetermined connection areas.

The piping 32 in the assembled unit 34 is designed, built and qualified to meet the cooling requirements of the power converter modules and the shock and vibration requirements of the ship and to supply required cooling to the modules. Flexible piping within each enclosure connecting the components with the service panel is designed for a quick disconnect and isolation valves are installed into the required sections of hard piping to allow isolation of individual power modules or groups of power converter modules.

The electrical system is designed to meet the power and instrumentation and control requirements of the power conversion modules and the supporting instrumentation. The power cables 30 are supplied to the service panel 24 from cableways 36 through openings 38 at the top if the service panel. The cabling 30 is routed and tested within the unit 34 during assembly and provided with connectors for connection to ship's cabling after the integrated unit is placed in the ship. Main power is directed to the service panel 24 from which it is connected into the individual power modules, permitting quick disconnect when the modules are to be removed from the enclosures. Control wiring at the service panel 24 and at the power module is also arranged for quick disconnect. The control wiring is preferably supported by a movable hanger so that it can remain connected when a power module is racked out for testing. All cabling and bus work is designed to minimize skin effect, stray inductance and electromagnetic interference and the internal structures in the unit 34 are provided with sufficient insulation and spacing as determined by the voltages involved.

In an alternative embodiment, rather than mounting separate power conversion modules in welded enclosures 20 built on the platforms 12, entire power converter cabinets are mounted on the platforms 12 to produce the unit 34 which is then integrated into a ship's structure in the same manner.

With the unique arrangement for integrating power converter equipment into a ship's structure in an assembled unit supported on isolation mounts in accordance with the invention, shipbuilders can use conventional power converting components which do not necessarily meet the shock, vibration and electromagnetic isolation standards required for use in ships, thereby making it possible to take advantage of conventional technology to improve a ship's performance. By using commercial technology in this way the responsibility for enclosure qualification may be shifted from a commercial manufacturer to the shipbuilder, thereby reducing cost. Cost advantages may also be realized in the construction process by prefabrication of the structure 34 and later installation of the converter modules. Moreover, maintenance and repair of individual modules can be performed outside the ship instead of requiring that they be repaired in place or that an entire power converter cabinet be removed for repair.

Although the invention has been described herein with reference to specific embodiments, many modifications and variations therein will readily occur to those skilled in the art. Accordingly, all such variations and modifications are included within the intended scope of the invention.

We claim:

1. A power converter arrangement for integration into a ship structure comprising a platform for supporting at least one power converter module, isolation mount means for supporting the platform integral with a ship's hull structure, enclosure means on the platform for enclosing at least one power converter module, power cable, cooling pipe and control line means for supplying power, cooling liquid and control signals to the enclosure; and movable support means mounted in the enclosure for supporting a power converter module and moving the power converter module from an installed position within the enclosure to an exposed position to facilitate testing and inspection.

2. An arrangement according to claim 1 including flexible couplings for connecting the power conversion module to at least one of cooling liquid lines, power supply lines and control lines to facilitate removal of the power conversion module from the installed position in the enclosure.

3. An arrangement according to claim 1 wherein the enclosure comprises walls, cabling and bus work arranged to minimize skin effect, stray inductance and electromagnetic interference.

4. An arrangement according to claim 1 including a plurality of enclosures arranged in rows on the platform and a service panel forming a back wall of each enclosure through which power lines, cooling liquid piping and control lines are connected to the enclosures.

5. An arrangement according to claim 1 wherein the platform, enclosure and power lines and cooling lines are prefabricated for subsequent installation in a ship.

6. A method for integrating a power converter enclosure into a ship structure comprising providing an enclosure on a platform, providing power cables, cooling liquid lines and control lines to the enclosure on the platform, providing movable power converter module support means within the enclosure for movably supporting a power converter module for motion into and out of the enclosure, and mounting the platform with the enclosure on a plurality of isolation mounts integral with the hull structure of a ship.

7. A method according to claim 6 including installing a power conversion module in the enclosure before the platform is mounted in the hull structure of a ship.

8. A method according to claim 6 including installing a power conversion module in the enclosure after the platform has been mounted in the hull structure of a ship.

9. A method according to claim 6 wherein the enclosure provided on the platform comprises a complete power converter cabinet containing preinstalled power converter equipment.

* * * * *